(12) United States Patent
Chou

(10) Patent No.: US 11,599,570 B2
(45) Date of Patent: Mar. 7, 2023

(54) DEVICE AND METHOD TO RENDER MULTIMEDIA DATA STREAM TAMPER-PROOF BASED ON BLOCK CHAIN RECORDING

(71) Applicant: HON HAI PRECISION INDUSTRY CO., LTD., New Taipei (TW)

(72) Inventor: Chia-Hung Chou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/372,736

(22) Filed: Jul. 12, 2021

(65) Prior Publication Data

US 2022/0012276 A1    Jan. 13, 2022

(30) Foreign Application Priority Data

Jul. 13, 2020    (CN) .......................... 202010670271.3

(51) Int. Cl.
*G06F 16/30* (2019.01)
*G06F 16/48* (2019.01)
*G06F 16/27* (2019.01)

(52) U.S. Cl.
CPC .............. *G06F 16/48* (2019.01); *G06F 16/27* (2019.01)

(58) Field of Classification Search
CPC ................................. G06F 16/48; G06F 16/27
See application file for complete search history.

(56) References Cited

U.S. PATENT DOCUMENTS

| 11,368,289 B1* | 6/2022 | Kvochko | H04L 9/0643 |
| 2008/0010466 A1* | 1/2008 | Hopper | G11B 20/00123 |
| | | | 713/181 |
| 2019/0089716 A1* | 3/2019 | Stöcker | H04L 67/104 |
| 2020/0159891 A1* | 5/2020 | Patel | G06F 21/16 |
| 2021/0037270 A1* | 2/2021 | Taylor | H04L 9/3242 |
| 2021/0112306 A1* | 4/2021 | Ye | H04N 21/278 |

FOREIGN PATENT DOCUMENTS

| CN | 107871063 | 4/2018 |
| CN | 110309325 | 10/2019 |

* cited by examiner

*Primary Examiner* — Khanh B Pham
(74) *Attorney, Agent, or Firm* — ScienBiziP, P.C.

(57) ABSTRACT

A method for rendering a multimedia data stream tamper-proof and of evidential value when recorded in a block chain system reads and decodes the multimedia data stream to obtain multiple frames of data arranged in sequence, and calculates a hash value of each frame of data of the multimedia data stream. One or more items of data are selected from the multiple frames of data based on a predetermined rule and information as to properties of the one or more items of data is uploaded to the block chain system for recording purposes. A device for applying the method to a multimedia data stream is also disclosed.

12 Claims, 5 Drawing Sheets

DEVICE AND METHOD TO RENDER MULTIMEDIA DATA STREAM TAMPER-PROOF BASED ON BLOCK CHAIN RECORDING

FIELD

The subject matter herein generally relates to verification by block chain.

BACKGROUND

Block chain technology provides distributed data storage, point-to-point transmission, a consensus mechanism, and encryption algorithms. The block chain technology employs a consensus mechanism such as Proof of Work to achieve validation of a block in a chain. A mathematical algorithm can establish rights between different nodes in the block chain system.

Surveillance devices or audio recording devices are common in a specific area, and recorded content can be used as an evidence in court when necessary. However, content said to have been recorded is easy to forge and proving a recording time of recorded content is not automatic.

Thus, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
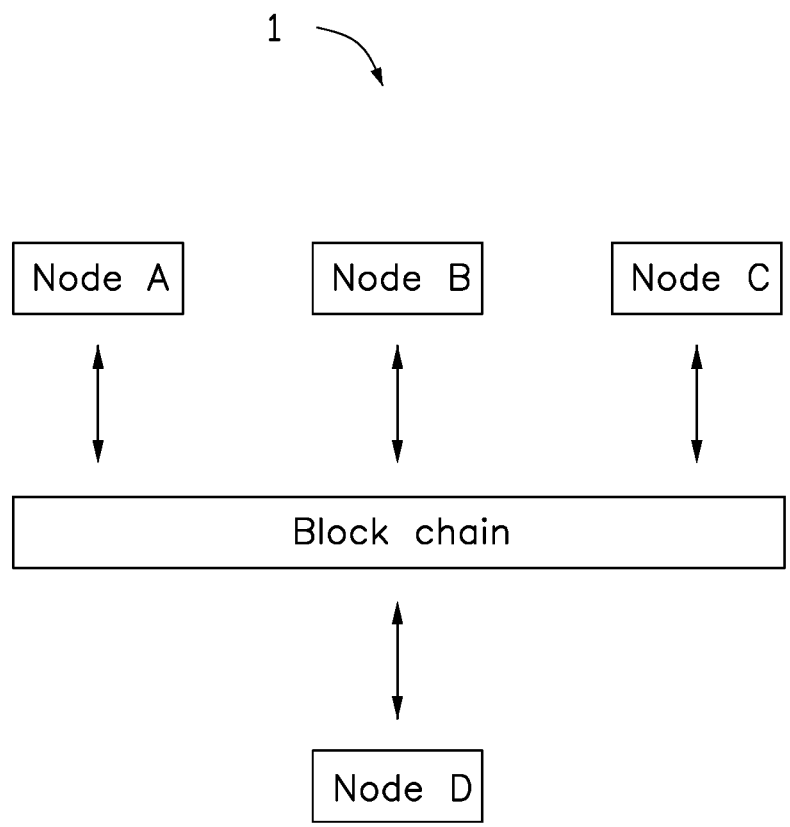
FIG. 1 illustrates a block view of an embodiment of a block chain system according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a block view of an embodiment of a block chain system. The block chain system 1 comprises a block chain network and a block chain. The block chain network comprises a number of nodes. The nodes can comprise public nodes or private nodes, and each node can perform in a system time synchronized through a recognized network time protocol (NTP). A block chain user can use a client terminal, for example, a computer, a smart phone, or the like, to communicate and interact with any other node. For example, the block chain user can communicate with any node through a webpage or an application of a smart phone. The client terminal can upload specific information to the block chain system 1 for storing.

In FIG. 1, the block chain network comprises four nodes, respectively A, B, C, and D. However, the number of the nodes is not limited to four, the block chain network can include more nodes.

In can be understood that, each node takes account of blocks based on the consensus mechanism. When any node broadcasts information of the block to the block chain network, the other nodes receive and verify the received block. When a ratio of a quantity of verified nodes to a quantity of total nodes in the block chain network is greater than a predetermined threshold, the verification of the block chain network up to the block is determined to be passed, and all nodes can accept and take account of the block.

Figure 2:
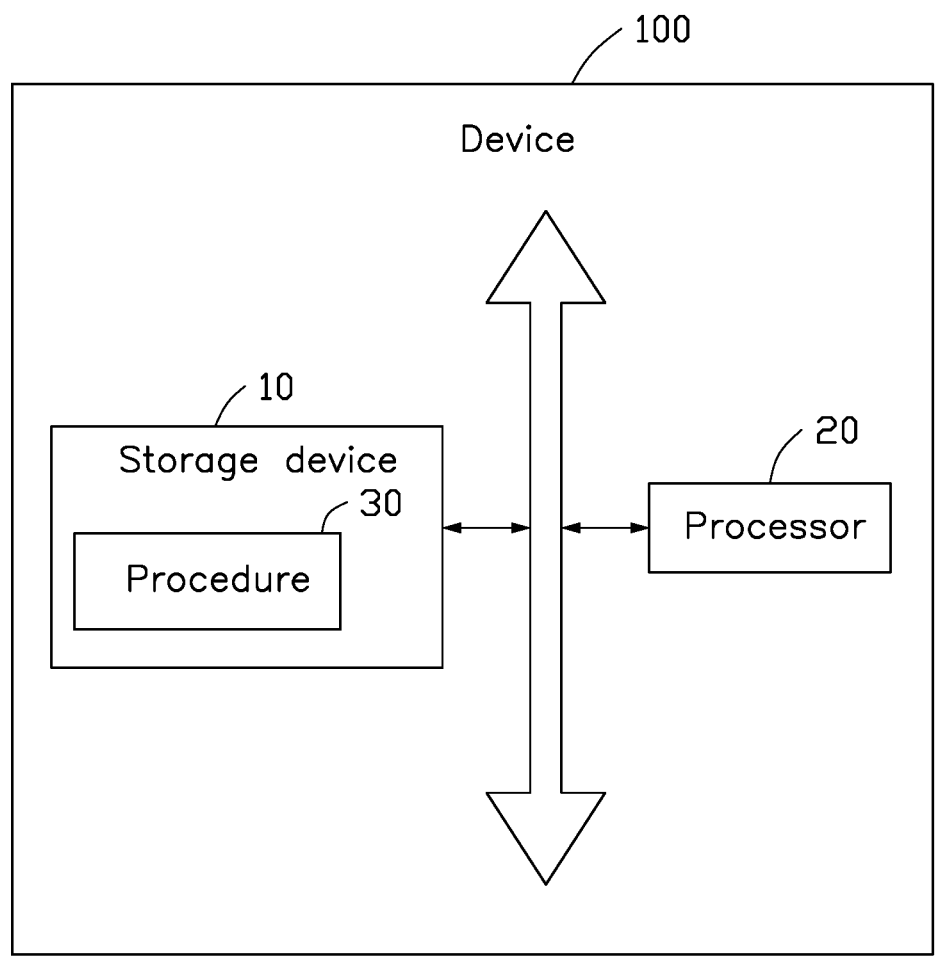
FIG. 2 illustrates a block view of an embodiment of a device for preventing tampering with multimedia data stream based on the block chain system of FIG. 1.

FIG. 2 illustrates a block view of an embodiment of a device for rendering a multimedia data stream tamper-proof based on the block chain system 1.

In one embodiment, the device 100 can comprise a storage device 10, at least one processor 20, and a procedure for rendering multimedia data stream tamper-proof (procedure 30) stored in the storage device 10. The procedure 30 can be run on the at least one processor 20. The at least one processor 20 can execute the procedure 30 to accomplish the steps of a method for protecting the content and sequentiality of a multimedia data stream, for example, the blocks 500-510 of FIG. 5. The at least one processor 20 can alternatively execute the procedure 30 to accomplish the function of the modules of the procedure 30, for example, to accomplish the function of the modules 101-104 of FIG. 3.

Figure 3:
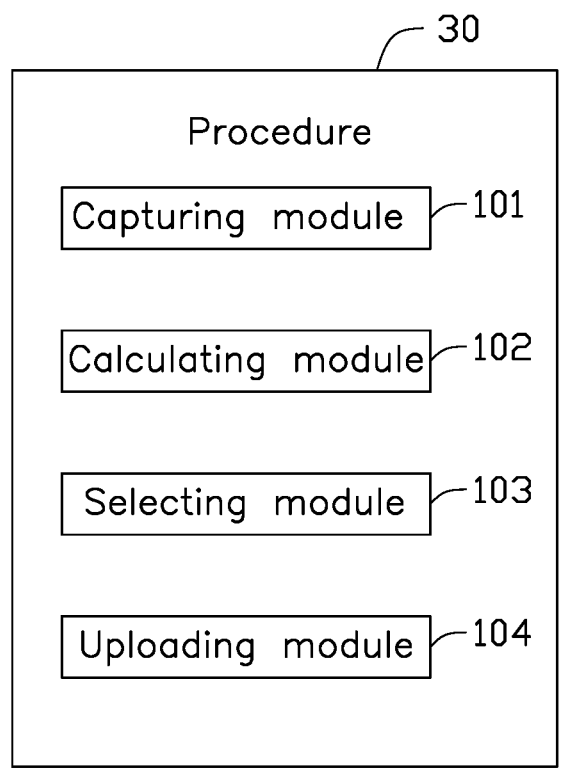
FIG. 3 illustrates a block view of an embodiment of a procedure for preventing tampering with multimedia data stream of the device of FIG. 2.

The procedure 30 can be divided into one or more modules/units. The one or more modules/units can be stored in the storage device 10 and executed by the at least one processor 20. The one or more modules/units can be a series of program instruction segments, which can perform specific functions, and the instruction segment is configured to describe the execution process of the procedure 30 in the device 100. For example, the procedure 30 can be divided into a capturing module 101, a calculating module 102, a selecting module 103, and a uploading module 104, as shown in FIG. 3. The detail function of each module is described in FIG. 3.

It can be understood that, the block view exemplified in FIG. 2 is an example of the device 100. The block view is not to be considered as limiting the device 100. Additional components can be added, or fewer components can be utilized, or some components can be combined, or different components can be used without departing from this disclosure. For example, the device 100 may comprise a display device, a network accessing device, a bus, or the like.

The at least one processor 20 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 20 can be a microprocessor or any regular processor, or the like.

The storage device 10 stores the procedure 30 and/or modules/units. The at least one processor 20 can run or execute the procedure 30 and/or modules/units stored in the storage device 10, and accomplish the various functions of the device 100. In addition, the storage device 10 can include a non-transitory storage medium, such as hard disk, memory, plug-in hard disk, smart media card, secure digital, flash card, at least one disk storage device, flash memory, or other transitory storage medium.

FIG. 3 illustrates a block view of an embodiment of the procedure 30.

The procedure 30 can comprise the capturing module 101, the calculating module 102, the selecting module 103, and the uploading module 104. In one embodiment, the modules can be stored in the storage device 10 and can be run on the at least one processor 20. It can be understood that, in other embodiments, the modules can be instructions or firmware resident in the at least one processor 20.

The capturing module 101 captures a multimedia data stream and decodes the multimedia data stream to obtain multiple frames of decoded data arranged in sequence.

In one embodiment, the capturing module 101 can read the multimedia data stream from a specified storage area and decode the multimedia data stream. For example, the capturing module 101 reads and decodes multimedia data stream to obtain 1st (first) frame of data to Nth frame of data. 1st frame is the start frame of the multimedia data stream, 2th frame is a next frame of the 1st frame, and Nth frame is the end frame of the multimedia data stream. The number N can be a positive integer greater than 1.

In one embodiment, the multimedia data stream can be a encoded video data stream or an encoded audio data stream. The frame of data can be images or of audio data.

In one embodiment, an electronic device with a recording function can record and generate the multimedia data stream in real time, the electronic device can instantly encode and compress the generated multimedia data stream through a moving picture experts group (MPEG) encoding technology or an H.264 encoding technology to obtain a multimedia file, effectively extending a storage capacity.

In one embodiment, in order to enable relevant information of the multimedia data stream to be instantly uploaded to the block chain system 1, when the electronic device stores the instantly-encoded multimedia data stream in the specified storage area and the multimedia file is not generated, the capturing module 101 can read the encoded multimedia data stream stored in the specified storage area through a pipe communication method, and decode the encoded multimedia data stream in real time to obtain the multiple frames of data arranged in sequence. The multimedia data stream read by the capturing module 101 through the pipe communication method may be a part of or all of multimedia data stream stored in the specified storage area.

In one embodiment, the electronic device with the recording function may cause distortion of content in a process of encoding and compressing multimedia data streams to generate the multimedia files. The multimedia data stream read by the capturing module 101 is not the original data stream recorded and generated by the electronic device, but the encoded data stream, so that a consistent hash value can be obtained for comparison when the multimedia file is decoded for verifying.

In one embodiment, the specified storage area may be a data storage of the electronic device or a cloud storage. The device 100 can communicate with the electronic device or the cloud storage through a wired communication mode or a wireless communication mode, and the capturing module 101 can capture the multimedia data stream from the specified storage area.

The calculating module 102 calculates a hash value of the start frame of data, and the hash value of the start frame of data can be spliced in front of the next frame of data with respect to the start frame. The calculating module 102 can further calculate a hash value of the next, or second, frame of data based on the hash value of the start frame of data and the data of the following frame.

In one embodiment, the calculating module 102 can repeat a step of splicing the hash value of the current frame of data in front of a next frame of data with respect to the current frame and perform a hash operation on the next frame of data until a hash value of the end frame of data is calculated.

In one embodiment, when the multimedia data stream is decoded to obtain the multiple frames of data, the calculating module 102 can perform a hash operation on each frame of data in sequence until the hash value of each frame of data is calculated.

Figure 4:
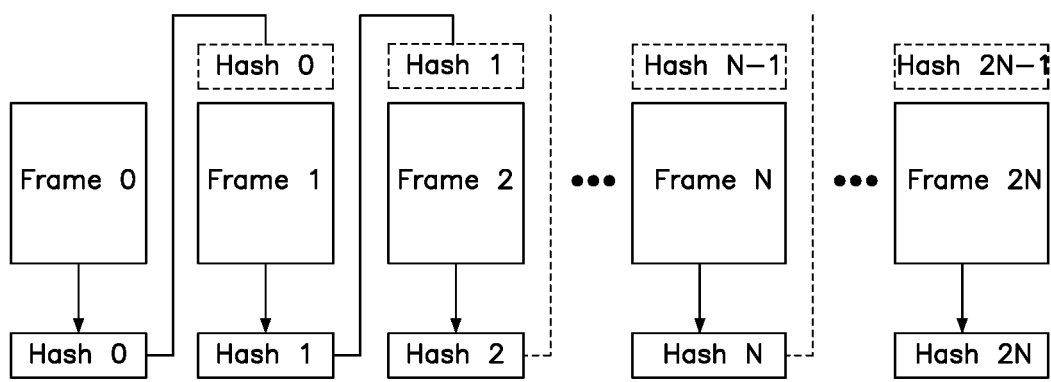
FIG. 4 illustrates a schematic view of an embodiment of a hash value of each frame containing data in a multimedia data stream calculated by the device of FIG. 2.

FIG. 4 illustrates a view of the hash value of each frame data calculated by the calculating module 102.

For example, the multimedia data stream is decoded to obtain 2N+1 frame data Frame_0 to Frame_2N arranged in sequence. The start frame of data is the frame data Frame_0, and the end frame of data is the frame data Frame_2N. A hash value calculating method of the calculating module 102 comprises: step a1, the calculating module 102 performing a hash operation on the frame data Frame_0 to obtain a hash value Hash_0 of the frame data Frame_0; step a2, the calculating module 102 splicing the hash value Hash_0 of the frame data Frame_0 in front of a next frame data Frame_1, and performing a hash operation on the frame data Frame_1 to obtain a hash value Hash_1 of the frame data Frame_1; in step a3, the calculating module 102 repeating the calculation method of step a2 until a hash value Hash_2N−1 of the frame data Frame_2N−1 is added to the front of the frame data Frame_2N, and the calculating module 102 performing a hash operation on the frame data Frame_2N to obtain a hash value Hash_2N of the frame data Frame_2N.

In one embodiment, the calculating module 102 performing the hash operation on the frame data Frame_0 can comprise performing the hash operation on data of the start frame. The calculating module 102 performing the hash operation on the frame data Frame_1 can comprise performing the hash operation on a data set with the hash value Hash_0 and data of the second frame. The calculating module 102 performing the hash operation on the frame data Frame_2N can comprise performing the hash operation on a data set with the hash value Hash_2N−1 and data of the end frame.

In one embodiment, the calculating module 102 can employ a current hash operation method to implement a hash operation on a frame of data. For example, the current hash operation method can be an audio-aware hashing algorithm or a video-aware hashing algorithm.

The selecting module 103 selects one or more items of data from the multiple frames of data based on a predetermined rule.

In one embodiment, a volume of data of the multimedia data stream is large, and the number of frames of data decoded by the multimedia data stream is larger. If the properties of each frame data is uploaded as information to the block chain system 1 for storing, it may cause a high network burden to the blockchain network. The selecting module 103 can select one or more items of data from the multiple frames of data based on the predetermined rule, the properties of the one or more items of data being uploaded as additional information to the block chain system 1.

In one embodiment, the predetermined rule can be defined based on an actual application. For example, the predetermined rule defines data contained in every m frames as an item of data, m is a positive integer. Such as, the multiple frames of data comprise frame data Frame_0 to Frame_2N arranged in sequence. The predetermined rule can define frame data Frame_0, frame data Frame_m, frame data Frame_2m, frame data Frame_3m, etc. as the items of data.

For example, the multiple frames of data comprise frame data Frame_0 to Frame_100 arranged in sequence, m is equal to 5. The predetermined rule can define frame data Frame_0, frame data Frame_5, frame data Frame_10, frame data Frame_15, . . . , and frame data Frame_100 as the items of data.

In one embodiment, the predetermined rule may define key frames described in a H.264 coding specification as items of data, the selecting module 103 may determine the key frames data comprised in the multiple frames of data according to the H.264 coding specification, and define the data in such key frames as the items of data.

The uploading module 104 uploads information as to the properties of the one or more items of data to the block chain system 1.

In one embodiment, the properties can comprise a hash value, a serial number, and an identity document (ID) of the multimedia data stream. For example, the items of data comprises the frame data Frame_0, the properties of the frame data Frame_0 can comprise the hash value Hash_0 of the frame data Frame_0, the serial number of the frame data Frame_0, and the ID of the multimedia data stream.

In one embodiment, the ID of the multimedia data stream can be an identity number of the multimedia data stream or an identity number of the multimedia file. The ID uniquely represents an identity of the multimedia data stream captured by the capturing module 101.

For example, the ID of the multimedia data stream is A_B_C, the items of data are comprised in the frame data Frame_0, the frame data Frame_m, and the frame data Frame_2m. The properties of the frame data Frame_0 can comprise a set of {Hash_0, Frame_0, A_B_C}, the properties of the frame data Frame_m can comprise a set of {Hash_m, Frame_m, A_B_C}, and the properties of the frame data Frame_2m can comprise a set of {Hash_2m, Frame_2m, A_B_C}.

In one embodiment, when the item of data is selected, the uploading module 104 can upload the information as to the properties of such data to the block chain system 1, and the properties of such data can be saved in the block chain system 1.

In one embodiment, the uploading module 104 does not need to upload the recorded multimedia data stream to the block chain system 1 to ensure that there is no tampering with the multimedia file, the uploading module 104 can only upload the properties of specified frames of data to the block chain system 1 to create a tamper-proof multimedia file. The network burden of the blockchain network can thus be reduced.

In one embodiment, when the properties of the items of data is uploaded to the block chain system 1, the block chain system 1 can receive a request to save the properties of the item of data, and the block chain system 1 may control each node to verify the request to save. Each node in the block chain system 1 can verify and confirm a data saving operation of the properties.

For example, the block chain system 1 comprises the four nodes A~D, each node A~D can verify the data saving operation. When there is verification of any node in the block chain system 1 to the data saving operation, a verification information is broadcast to the other nodes. For example, the data saving operation to the node A is verified, and the node A may broadcast the verification information to the other modes B-D, the node A also receiving the verification broadcast from the other nodes B-D.

In one embodiment, the block chain network can reach a consensus as to the data saving operation when the quantity of verifications received by the node is greater than a first predetermined value. The node may take account of the block generated in the data saving operation.

For example, when the quantity of verifications received by the node A is greater than the first predetermined value, and the block chain network reaches a consensus as to the data saving operation, the node A can save a block generated in the data saving operation. When the quantity of verifications received by the node B is greater than the first predetermined value, and the block chain network reaches a consensus as to the data saving operation, the node B can save the block generated in the data saving operation.

In one embodiment, the first predetermined value can be set according to the consensus mechanism. For example, the first predetermined value can be set to be for example a proportion of two-thirds of the total nodes.

In one embodiment, in order to obtain a proof of recording times of the multimedia data stream, when the block chain system 1 receives the request to save of the properties of the items of data, the block chain system 1 may add a timestamp T1 of a current system time to the properties of the items of data. The timestamp T1 records a point in time that the block chain system 1 receives the saving request of the properties of the items of data. For example, where the items of data comprises the frame data Frame_0, the block chain system 1 adds the timestamp T1 of the current system time to the properties of the frame data Frame_0, the properties of the frame data Frame_0 comprising a set of {Hash_0, Frame_0, A_B_C, T1}

In one embodiment, when the nodes in the block chain network are in consensus, each node can check the timestamp in the properties to determine whether the properties is authentic. When the quantity of verifications received by a node is greater than the first predetermined value, the node further determines whether a current system time of the node is greater than the time recorded by the timestamp. If the current system time of the node is greater than the time recorded by the time stamp, the node can save the properties of the item of data. If the current system time of the node is less than the time recorded by the timestamp, the properties of the item of data is regarded as not authentic, and the node is discarded to save the properties of the item of data.

For example, when the quantity of verifications received by the node A is greater than the first predetermined value, this indicates that the block chain network is in consensus with respect to the properties of the item of data, and the node A determines whether the current system time is greater than the point in time recorded by the timestamp of the properties of the items of data. If the current system time of the node A is greater than the time recorded by the timestamp, the node A can save the block generated in the items of data saving operation, and the properties of the item of data can be saved to node A. If the current system time of the node A is less than the time recorded by the timestamp, the properties of the item of data is regarded as not authentic, and no block packing is performed.

In one embodiment, the block chain system 1 can comprise a master node and multiple slave nodes, and each node can perform block accounting through a block synchronization mechanism. Each node can determine whether a block synchronization time is greater than the point in time recorded by the timestamp to check the timestamp.

In one embodiment, if properties of items of data of a multimedia file F1 is uploaded to the block chain system 1, the multimedia file F1 needs to be verified. Steps to verify the multimedia file F1 can comprise: step b1, decoding the multimedia file F1 to obtain multiple first frames of data arranged in sequence, and employing the above described hash operation method to calculate a hash value of each first frame of data; step b2, extracting timestamps and hash values corresponding to the one or more items of data of the multiple first frames of data from the block chain system 1 based on an ID of the multimedia file F1 and serial numbers of the one or more items of data; step b3, determining whether each calculated hash value of the one or more items of data is the same as each extracted hash value of the one or more items of data; step b4, confirming the multimedia file F1 is not tampered with if each calculated hash value of the one or more items of data is the same as each extracted hash value of the one or more items of data, and defining points in time recorded by the timestamps as a proof of recording times of the multimedia file F1.

In one embodiment, when a frame of data of the multimedia file F1 is tampered with, deleted, or added-to, hash values of the frame of data and other frames of data after this frame of data will be changed, and hash values of the items of data after the frame of data are different from hash value of the items of data stored in the block chain system 1.

For example, a surveillance camera captures video and sound in real time and transmits multimedia stream to a encoder to encode and store encoded multimedia stream in a specified storage area S1 through a H.264 encoding protocol, generating ID UID_1 as the ID of the multimedia stream. The program 30 can read the multimedia stream UID_1 from the storage area S1 in real time, and decode the multimedia stream UID_1 to obtain a plurality of frames of data arranged in sequence. The program 30 can employ the above described hash operation method to calculate hash values of the plurality of frames of data, and upload properties (UID_1, a serial number of the specified frame of data, and a hash value of the specified frame of data) of specified frame of data to the block chain system 1. The block chain system 1 can add a timestamp to the properties (UID_1, a serial number of the specified frame of data, a hash value of the specified frame of data, and a timestamp) of the specified frame of data. Each node of the block chain system 1 can perform a consensus operation and a timestamp checking operation on the properties of the specified frame of data.

When the multimedia stream UID_1 needs to be verified, the multimedia stream UID_1 can be read from the storage area S1, and the multimedia stream UID_1 is decoded to obtain a plurality of frames of data. A hash value of each frame of data of the multimedia stream UID_1 can be calculated through the above described hash operation method. Timestamps and hash values corresponding to one or more items of data of the multimedia stream UID_1 can be extracted from the block chain system 1 based on the ID of the multimedia stream UID_1 and serial numbers of the one or more items of data. If each calculated hash value of the one or more items of data is the same as each extracted hash value, this indicates that the multimedia stream UID_1 is authentic and not tampered with, and points in time recorded by the timestamps can be taken as proof of recording times of the multimedia stream UID_1.

Figure 5:
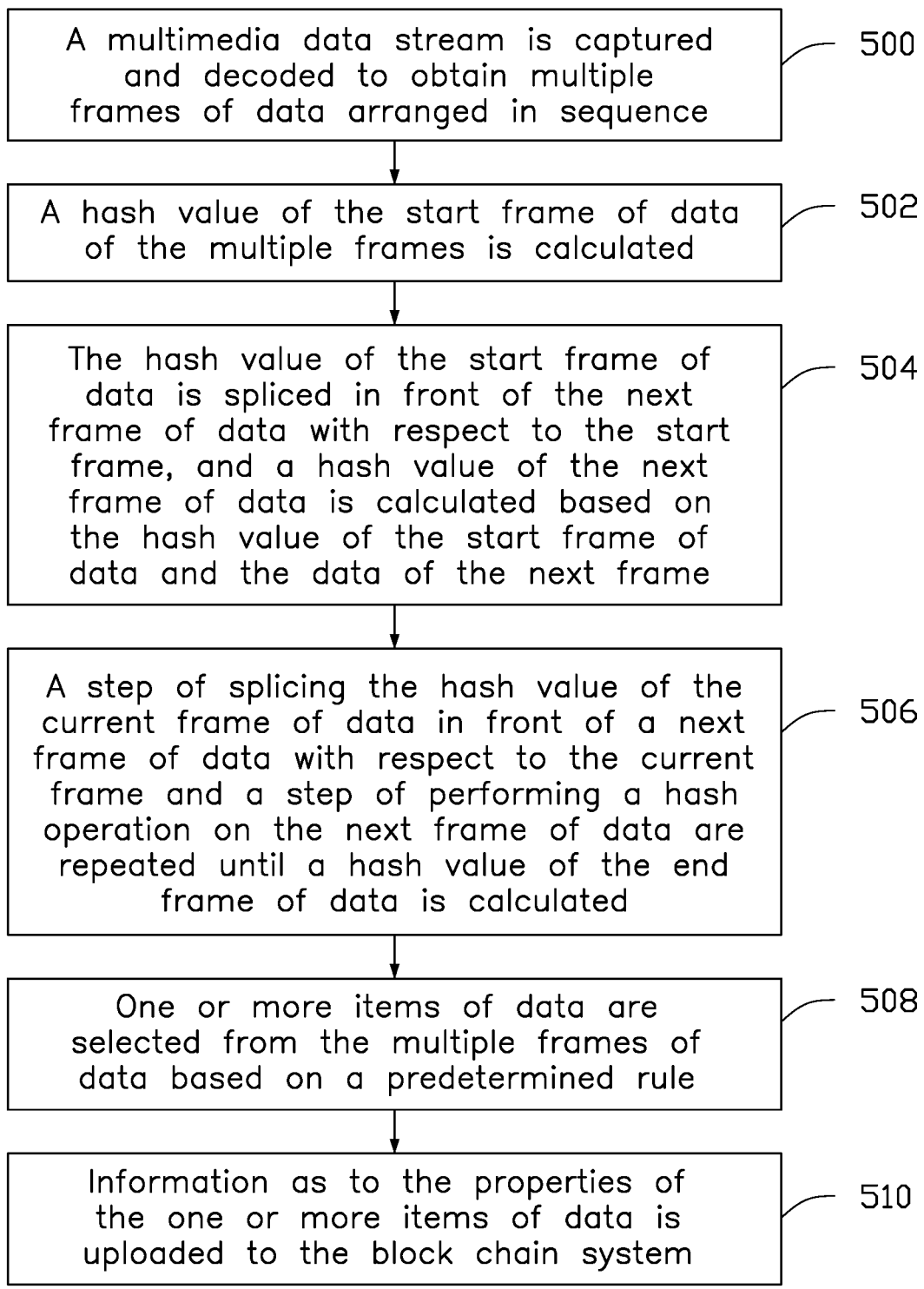
FIG. 5 illustrates a flowchart of an embodiment of a method for rendering multimedia data stream tamper-proof, utilizing the block chain system of FIG. 1.

FIG. 5 illustrates one exemplary embodiment of a method for rendering a multimedia data stream tamper-proof based on a block chain system. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each block shown in FIG. 5 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 500.

In block 500, a multimedia data stream is captured and decoded to obtain multiple frames of data arranged in sequence.

In one embodiment, the multimedia data stream can be captured from a specified storage area. For example, the multimedia data stream is decoded to obtain 1st (first) frame of data to Nth frame of data. 1st frame of data is the start frame of data of the multimedia data stream, 2th frame of data is a next frame of data of the 1st frame, and Nth frame of data is the end frame of data of the multimedia data stream. The number N can be a positive integer greater than 1.

In one embodiment, the multimedia data stream can be a encoded video data stream or an encoded audio data stream. The frame of data can be an image or an audio data.

In one embodiment, an electronic device with a recording function can record and generate the multimedia data stream in real time, the electronic device can instantly encode and compress the generated multimedia data stream through a moving picture experts group (MPEG) encoding technology or an H.264 encoding technology to obtain a multimedia file, effectively extending a storage capacity.

In one embodiment, in order to enable relevant information of the multimedia data stream to be instantly uploaded to the block chain system 1, when the electronic device stores the instantly-encoded multimedia data stream in the specified storage area and the multimedia file is not generated, the encoded multimedia data stream stored in the specified storage area can be read through a pipe communication method, and the encoded multimedia data stream can be decoded in real time to obtain the multiple frame data arranged in sequence.

In one embodiment, the electronic device with the recording function may cause distortion of content in a process of encoding and compressing multimedia data streams to generate the multimedia files. The multimedia data stream is not the original data stream recorded and generated by the electronic device, but the encoded data stream, so that a consistent hash value can be obtained for comparison when the multimedia file is decoded for verifying.

In one embodiment, the specified storage area may be a data storage of the electronic device or a cloud storage.

In block 502, a hash value of the start frame of data of the multiple frames is calculated.

In block 504, the hash value of the start frame of data is spliced in front of the next frame of data with respect to the start frame, and a hash value of the next frame of data is calculated based on the hash value of the start frame of data and the data of the next frame.

In block 506, a step of splicing the hash value of the current frame of data in front of a next frame of data with respect to the current frame and a step of performing a hash operation on the next frame of data are repeated until a hash value of the end frame of data is calculated.

In one embodiment, when the multimedia data stream is decoded to obtain the multiple frames of data, a hash operation on each frame of data can be performed in sequence until the hash value of each frame of data is calculated.

For example, the multimedia data stream is decoded to obtain 2N+1 frame data Frame_0 to Frame_2N arranged in sequence. The start frame of data is the frame data Frame_0, and the end frame of data is the frame data Frame_2N. A hash value calculating method of each frame of data can comprise: step a1, a hash operation being performed on the frame data Frame_0 to obtain a hash value Hash_0 of the frame data Frame_0; step a2, the hash value Hash_0 of the frame data Frame_0 being spliced in front of a next frame data Frame_1, and a hash operation being performed on the frame data Frame_1 to obtain a hash value Hash_1 of the frame data Frame_1; in step a3, the calculation method of step a2 being repeated until a hash value Hash_2N−1 of the frame data Frame_2N−1 is added to the front of the frame data Frame_2N, and a hash operation being performed on the frame data Frame_2N to obtain a hash value Hash_2N of the frame data Frame_2N.

In one embodiment, the hash operation is performed on the frame data Frame_0 can comprise performing the hash operation on data of the start frame. The hash operation is performed on the frame data Frame_1 can comprise performing the hash operation on a data set with the hash value Hash_0 and data of the second frame. The hash operation is performed on the frame data Frame_2N can comprise performing the hash operation on a data set with the hash value Hash_2N−1 and data of the end frame.

In one embodiment, a current hash operation method can be can employed to implement a hash operation on a frame of data. For example, the current hash operation method can be an audio-aware hashing algorithm or a video-aware hashing algorithm.

In block 508, one or more items of data are selected from the multiple frames of data based on a predetermined rule.

In one embodiment, a volume of data of the multimedia data stream is large, and the number of frames of data decoded by the multimedia data stream is larger. If the properties of each frame of data is uploaded to the block chain system 1 for storing, it may cause a high network burden to the block chain network. The one or more items of data can be selected from the multiple frames of data based on the predetermined rule, the properties of the one or more items of data being uploaded as additional information to the block chain system 1.

In one embodiment, the predetermined rule can be defined based on an actual application. For example, the predetermined rule defines data contained in every m frames as an item of data, m is a positive integer. Such as, the multiple frames of data comprise frame data Frame_0 to Frame_2N arranged in sequence. The predetermined rule can define frame data Frame_0, frame data Frame_m, frame data Frame_2m, frame data Frame_3m, etc. as the items of data.

For example, the multiple frames of data comprise frame data Frame_0 to Frame_100 arranged in sequence, m is equal to 5. The predetermined rule can define frame data Frame_0, frame data Frame_5, frame data Frame_10, frame data Frame_15, . . . , and frame data Frame_100 as the items of data.

In one embodiment, the predetermined rule may define key frames described in a H.264 coding specification as items of data, the selecting module 103 may determine the key frames data comprised in the multiple frames of data according to the H.264 coding specification, and define the data in such key frames as the items of data.

In block 510, information as to the properties of the one or more items of data is uploaded to the block chain system 1.

In one embodiment, the properties can comprise a hash value, a serial number, and an identity document (ID) of the multimedia data stream. For example, the items of data comprises the frame data Frame_0, the properties of the frame data Frame_0 can comprise the hash value Hash_0 of the frame data Frame_0, the serial number of the frame data Frame_0, and the ID of the multimedia data stream.

In one embodiment, the ID of the multimedia data stream can be an identity number of the multimedia data stream or an identity number of the multimedia file. The ID uniquely represents an identity of the multimedia data stream.

For example, the ID of the multimedia data stream is A_B_C, the items of data are comprised in the frame data Frame_0, the frame data Frame_m, and the frame data Frame_2m. The properties of the frame data Frame_0 can comprise a set of {Hash_0, Frame_0, A_B_C}, the properties of the frame data Frame_m can comprise a set of {Hash_m, Frame_m, A_B_C}, and the properties of the frame data Frame_2m can comprise a set of {Hash_2m, Frame_2m, A_B_C}.

The embodiments shown and described above are only examples. Many details known in the relevant field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method of rendering a multimedia data stream tamper-proof based on a block chain system, the block chain system comprising multiple nodes, the method comprising:
    capturing a first multimedia data stream and decoding the first multimedia data stream to obtain multiple first frames of data arranged in sequence;
    calculating a hash value of a start frame of data of the multiple first frames;
    splicing the hash value of the start frame of data in front of a next frame of data with respect to the start frame, and calculating a hash value of the next frame of data based on the hash value of the start frame of data and the data of the next frame;

repeating to perform the splicing and the calculating until a hash value of an end frame of data of the multiple first frames is calculated;

selecting one or more first items of data from the multiple first frames of data based on a predetermined rule; and uploading information as to properties of the one or more first items of data to the block chain system;

wherein the properties comprise a hash value, a serial number, and an identity document (ID) of the multimedia data stream; and wherein uploading the information as to the properties of the one or more first items of data to the block chain system comprises:

controlling each of the multiple nodes to verify a saving request and adding a first timestamp of a current system time of the block chain system into the properties if the saving request of the properties of the one or more first items of data is received;

broadcasting a verification pass message to the block chain system if the node validates the saving request;

determining whether the current system time of the node is greater than a time recorded in the first timestamp if a number of the verification pass messages received by the node exceeds the first determined number; and controlling the node to save the information as to the properties of the one or more first items of data if the current system time of the node is greater than the time recorded in the first timestamp.

2. The method of claim 1, wherein the predetermined rule comprises:

defining data contained in every m frames as the first item of data in the multiple first frames of data, wherein m is a positive integer; or defining key frames of data in the multiple first frames of data as the first items of data.

3. The method of claim 1, wherein each of the multiple nodes performs a system time synchronization before adding the first timestamp into the properties.

4. The method of claim 1, further comprising:

controlling the node to discard saving the information as to the properties of the one or more first items of data if the current system time of the node is less than the time recorded in the first timestamp.

5. The method of claim 1, further comprising:

decoding a second multimedia stream to obtain multiple second frames of data arranged in sequence;

calculating hash values of one or more second items of data selected from the multiple second frames of data;

extracting second timestamps and hash values corresponding to the one or more second items of data from the block chain system according to an ID of the second multimedia stream and serial numbers of the one or more second items of data;

determining whether each of calculated hash values of the one or more second items of data is the same as each of extracted hash values of the one or more second items of data; and confirming the second multimedia stream is not tampered if each of the calculated hash values of the one or more second items of data is the same as each of the extracted hash values of the one or more second items of data; and defining points in time recorded by the second timestamps as a proof of recording times of the second multimedia stream.

6. The method of claim 1, wherein capturing the first multimedia data stream comprises:

capturing part or all of multimedia data stream stored in a specify storage area based on a pipe communication method if an electronic device compresses the multimedia data stream and stores compressed multimedia data stream to the specify storage area.

7. A device for anti-tampering multimedia data stream based on a block chain system, the block chain system comprising multiple nodes, the device comprising:

a storage device; and at least one processor;

wherein the storage device stores one or more programs, which when executed by the at least one processor, causing the at least one processor to:

capture a first multimedia data stream and decode the first multimedia data stream to obtain multiple first frames of data arranged in sequence;

calculate a hash value of a start frame of data of the multiple first frames;

splice the hash value of the start frame of data in front of a next frame of data with respect to the start frame, and calculate a hash value of the next frame of data based on the hash value of the start frame of data and the data of the next frame;

repeat to perform the splicing and the calculating until a hash value of an end frame of data of the multiple first frames is calculated;

select one or more first items of data from the multiple first frames of data based on a predetermined rule; and upload information as to properties of the one or more first items of data to the block chain system;

wherein the properties comprise a hash value, a serial number, and an identity document (ID) of the multimedia data stream; and wherein the at least one processor uploading the information as to the properties of the one or more first items of data to the block chain system comprises:

controlling each of the multiple nodes to verify a saving request and adding a first timestamp of a current system time of the block chain system into the properties if the saving request of the properties of the one or more first items of data is received;

broadcasting a verification pass message to the block chain system if the node validates the saving request;

determining whether the current system time of the node is greater than a time recorded in the first timestamp if a number of the verification pass messages received by the node exceeds the first determined number; and controlling the node to save the information as to the properties of the one or more first items of data if the current system time of the node is greater than the time recorded in the first timestamp.

8. The device of claim 7, wherein the predetermined rule comprises:

defining data contained in every m frames as the first item of data in the multiple first frames of data, wherein m is a positive integer; or defining key frames of data in the multiple first frames of data as the first items of data.

9. The device of claim 7, wherein each of the multiple nodes performs a system time synchronization before adding the first timestamp into the properties.

10. The device of claim 7, wherein the at least one processor is further configured to:

control the node to discard saving the information as to the properties of the one or more first items of data if the current system time of the node is less than the time recorded in the first timestamp.

11. The device of claim 7, wherein the at least one processor is further configured to:
    decode a second multimedia stream to obtain multiple second frames of data arranged in sequence;
    calculate hash values of one or more second items of data selected from the multiple second frames of data;
    extract second timestamps and hash values corresponding to the one or more second items of data from the block chain system according to an ID of the second multimedia stream and serial numbers of the one or more second items of data;
    determine whether each of calculated hash values of the one or more second items of data is the same as each of extracted hash values of the one or more second items of data; and
    confirm the second multimedia stream is not tampered if each of the calculated hash values of the one or more second items of data is the same as each of the extracted hash values of the one or more second items of data; and
    define points in time recorded by the second timestamps as a proof of recording times of the second multimedia stream.

12. The device of claim 7, wherein the at least one processor capturing the first multimedia data stream comprises:
    capturing part or all of multimedia data stream stored in a specify storage area based on a pipe communication method if an electronic device compresses the multimedia data stream and stores compressed multimedia data stream to the specify storage area.

* * * * *